United States Patent [19]

Kuring et al.

[11] 3,997,384

[45] Dec. 14, 1976

[54] SYSTEM FOR MAKING COLOR-CODED INDEX TABS

[76] Inventors: Victor Kuring, 275 Short Hills Ave., Springfield, N.J. 07101; W. R. Smith-Vaniz, 14 Pasture Lane, Darien, Conn. 06820; Jay L. Carley, 186 Orchard Hill Lane, Fairfield, Conn. 06430; William P. Shine, 31 E. Dale Drive, Monroe, Conn. 06468; Richard H. Darling, 10 Robert Court, Fairfield, Conn. 06430

[22] Filed: Feb. 25, 1974

[21] Appl. No.: 445,458

Related U.S. Application Data

[62] Division of Ser. No. 225,265, Feb. 10, 1972, Pat. No. 3,801,408.

[52] U.S. Cl. .............................. 156/269; 156/299; 156/303; 156/362; 156/542; 156/562; 156/DIG. 19; 156/DIG. 45

[51] Int. Cl.$^2$ ........................................ B32B 31/04

[58] Field of Search .......... 156/303, 261, 235, 238, 156/299, 302, 361, 362, 511, 516–520, 560–562, 249, 521, 541, 542, 250, DIG. 1–DIG. 2, 528, DIG.19–DIG. 21, 33, DIG.44–DIG. 47, 265, 269, 277; 93/1 E

[56] References Cited

UNITED STATES PATENTS

| | | | |
|---|---|---|---|
| 2,033,553 | 3/1936 | Scholl | 156/261 |
| 2,220,071 | 11/1940 | Avery | 156/518 |
| 3,506,525 | 4/1970 | Freemantle | 156/552 |

FOREIGN PATENTS OR APPLICATIONS

| | | | |
|---|---|---|---|
| 662,496 | 5/1963 | Canada | 428/245 |
| 236,414 | 7/1925 | United Kingdom | 156/DIG. 20 |

*Primary Examiner*—Charles E. Van Horn
*Assistant Examiner*—M. G. Wityshyn
*Attorney, Agent, or Firm*—Kenyon & Kenyon Reilly Carr & Chapin

[57] ABSTRACT

The color-coded index tab is produced automatically by passing a tape through a label applying machine which is programmed by a computer to apply color-coded labels at precise locations of the tape. The tape is afterwards severed to produce the individual index tab for subsequent application to a file holder. The index tabs can be folded or not about the longitudinal center line so that the block of color on each label can be exposed around the edge of the file holder or on a flat edge surface of the file holder for viewing purposes. The individual index tabs and labels can be sized to present any number of different color coded blocks.

16 Claims, 19 Drawing Figures

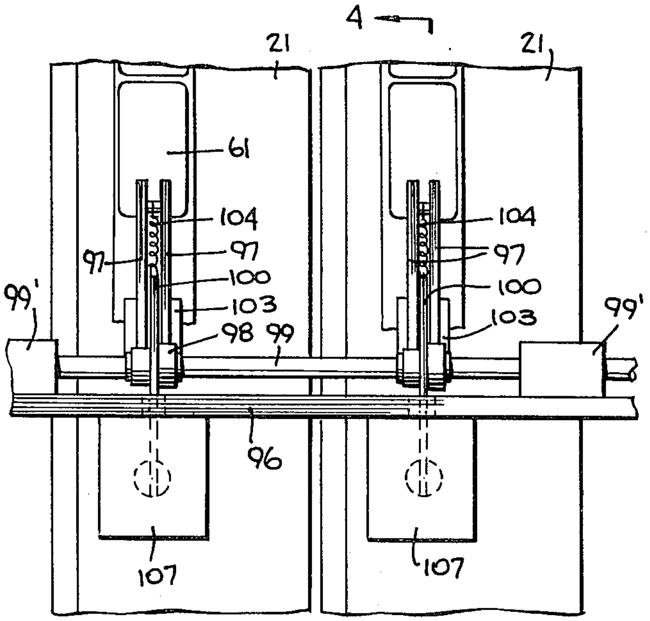
Fig. 3.
Fig. 5.
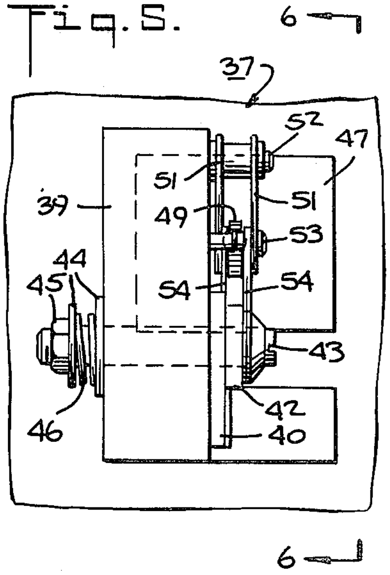
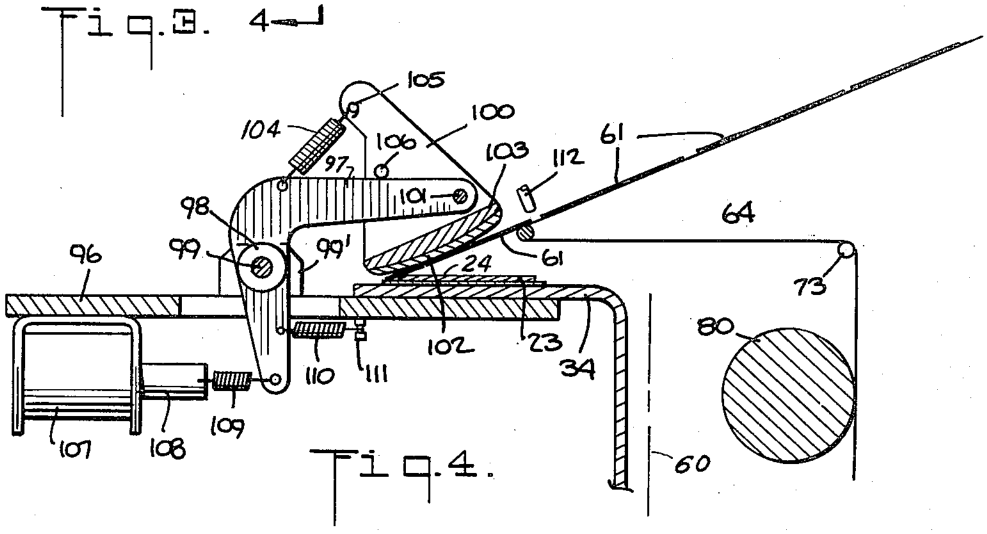
Fig. 4.
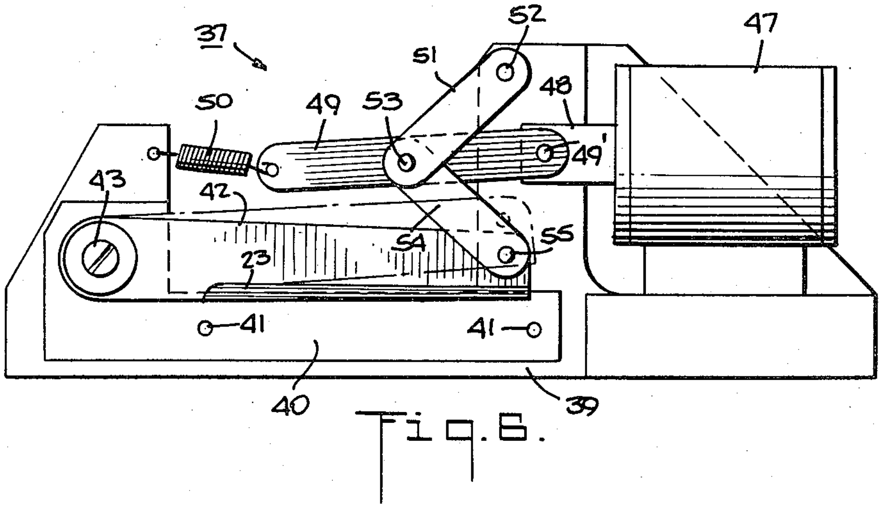
Fig. 6.

TAB #1
TAB #2
TAB #3
TAB #4

Label Assembly Operation Timing - 3 Sec. Max
10 Labels Per Index Tab Max.

SYSTEM FOR MAKING COLOR-CODED INDEX TABS

This is a division, of application Ser. No. 225,265 filed Feb. 10, 1972, now U.S. Pat. No. 3,801,408.

This invention relates to a system for making color-coded index tabs.

Heretofore, various filing systems have been known for filing information and for subsequently retrieving the information when desired. In many cases, these previous systems have relied upon the use of filing cabinents and the like in which the files are stored out of view. In order to retrieve the information from a given file, it has therefore been necessary to assign each file a code either based upon the alphabet or upon a number system and to place the file in a cabinet in accordance with the code. These sytems have, however, possessed a disadvantage in that, if a file is misfiled, it is necessary to check a large portion, if not all, of the filing system in order to retrieve the misplaced file. This has been a time-consuming and, thus, expensive operation.

Because of this disadvantage, various techniques have been used to avoid the problems of misfiles. For example, various systems have been used in which the filing folders have been provided with a color code along one edge so that the folders can be mounted in a vertical manner within an open faced filing cabinet. The intent of these systems is to have the color code edge of the file folders exposed to view so that if a particular filder is misplaced in the filing cabinet, the disparity between the sequence of colors can be readily noted and the file removed to the correct location in the cabinet. This leads to a higher speed in filing as well as in retrieval of files.

While the color-coded systems have substantially reduced the problem of misfiles, the cost of producing the file folders or labels to be used on the file folders in such systems have been relatively expensive. Furthermore, in some cases, the individual labels for the file folders have been made up on an individual basis and individually applied to the filer folder. This, of course, is time consuming and as a result increase the overall cost of the filing systems. In other cases in which preprinted color-coded index tabs have been used, a relatively large stock of the index tabs has been required either on premise or off premise. This results in additional costs for storing. Furthermore, such preprinted labels have been relatively expensive to produce because of the printing operation required to provide the tab with the proper color and indicia usually related therewith.

Accordingly, it is an object of this invention to provide a system for making color-coded index tabs in a relatively inexpensive manner.

It is another object of this invention to provide a system for making index tabs in an automatic manner.

It is another object of the invention to provide an index tab of simple and inexpensive construction.

It is another object of the invention to provide an automated system for producing a multiplicity of color-coded index tabs in a random sequence.

It is another object of the invention to permit on premise production of index tabs on an as needed basis for the preparation of files.

It is another object of the invention to provide a machine for making index tabs on an automated basis in a simple efficient low cost manner.

Briefly, the invention provides a system for making color-coded index tabs which are to be attached to file folders, filing cards, filing holders or the like structures. The index tabs include labels of colors each of which is keyed to a particular code number or code letters. Each label may also carry the corresponding indicia or other identification indicia thereon.

The system includes a label application machine in which individual labels are individually applied to a carrier strip, a label supply means from which the labels are supplied and a means to program the label application machine and supply means to place the labels at predetermined locations on the carrier strip.

The label application machine is provided with a conveyor which guides a tape made up of a carrier strip and a backing strip through a predetermined path past a particular starting point. The conveyor includes a stepper motor, or the like, which moves the tape through the machine while maintaining an indication of the position of the tape in the path of travel relative to the starting point. The label supply means are each mounted along the path of the tape at predetermined stations downstream of the start position so as to dispense a label onto the carrier strip of the tape.

The application machine and the supply means are programmed so that the stepper motor moves the tape past the respective supply means and stops the tape at predetermined distances from the starting point so that a label can be dispensed from a supply means onto the tape at a predetermined location. For example, since the tape is generally to be supplied with a plurality of labels, each of which is spaced apart from each other and from the ends of the resultant tab, the stepper motor is programmed to move the tape from the starting point a distance equal to the sum of the distance required to move the tape initially by the starting point to place the location at which the label is to be applied at the starting point and the distance required to move this location adjacent the proper label supply means to receive the label. In the case where the code is a number or alphabetical code, the individual labels are applied to the carrier strip in a sequence corresponding to the distances required for the tape to move past the various label application stations.

The label application machine further includes a receiving means for receiving the tape with the labels thereon. In one embodiment, the receiving means can be in the form of a roll on which the labelled tape is wound. In another embodiment, the receiving means utilizes a cutoff means for severing the tape at predetermined points relative to the initial starting point so as to cut off individual index tabs therefrom. In this case, a storage hopper can be utilized to receive the severed index tabs. Also, the cut-off means is programmed together with the supply means to effect a cut as a precise point.

In order to program the label application machine and the label supply means in proper sequence, any suitable means, such as a digital computer manufactured by the Digital Equipment Corporation under the designation PDP-8/e, is used. Such a computer can be utilized with any suitable input means such as a teletype, for example a Model 33 ASR including a typewriter, paper tape reader and punch; a punched card reader or other known input device can also be used.

The index tab which is made in accordance with the system includes a number of labels mounted on a carrier strip of a tape also having a removable backing strip. Each label is made from a strong gloss paper which resists abrasion and sunlight and has a permanent pressure sensitive adhesive back for securement to the carrier strip. The labels are supplied on a tape formed, e.g. of a peel-off backing. Further, each label is provided with a face of predetermined color which may or may not include e.g. a pair of indicia thereon corresponding to the color. The indicia are positioned symmetrically on the face of the label about the centerline and the label is adapted to be folded about this centerline upon application to a file folder or holder so as to carry an index on each side. The indicia can be in the form of a number of 0 to 9 or any combination thereof as well as in the form of a letter or other suitable marking.

In order to apply the index tab to a file, such as to a standard file folder, the backing strip is first peeled from the carrier strip and then the carrier strip with the labels thereon is folded about the edge of a file folder and secured thereto by means of the self-adhesive layer on the carrier strip. In the case where the index tab is applied to a file container such as a tape holder for a tape library, the index tab can be applied to an exterior edge surface.

The individual label supply means can be in the form of modules which are removably mounted on the machine. To this end, each module includes a housing, a label supply roll which is mounted within the housing and which consists of a flexible backing strip on which a plurality of spaced semi-rigid labels are removably secured, and a take-up roll mounted within the housing for taking-up the backing strip in the supply roll after the labels are dispensed. In addition, each module includes a means mounted within the housing for guiding the backing strip through a peel-off station between the supply roll and take-up roll so that each label can be removed from the backing strip. For these purposes, the housing has a first opening at the peel-off station so that the peeled label can be dispensed from the housing. In order to move the backing strip within the housing, a pressure roller is mounted within the housing behind the backing strip for selective projection through a second opening in the housing. The pressure roller is sized so as to push the backing strip through the second opening for engagement with a suitable means, such as a rotating capstan, so that the backing strip can be driven. The take-up roll is also provided with a suitable drive roller which extends out of a third opening in the housing so as to operably connect to a suitable drive means.

Each module is electrically connected into the programming means of the system so that the pressure roller is activated when a label is to be dispensed onto a tape adjacent to the module. For these purposes, the pressure roller is mounted on a movable means, such as a pivotally mounted arm, within the housing while the arm is connected to a solenoid so as to be pivoted thereby. Upon actuation of the solenoid, the pressure roller is projected through the second opening of the housing. In addition, a brake is provided within the housing so as to positively stop movement of the backing strip after a label has been dispensed. In order to ensure proper sequence of actuation between the pressure roller and the brake, both can be mounted on a single two arm layer which is actuated by the single solenoid.

Further, the label application machine is provided with a roll down assembly adjacent each label supplying means to ensure application of a dispensed label onto the travelling tape. Each roll down assembly includes a press block which is disposed over the path of the tape and means for pressing the press block against the tape upon expelling of a label from the adjacent supply means. The press block is further mounted so as to be activated by a solenoid electrically connected into the programming means.

In order to actuate the supply means and related roll down assembly in sequence, a sensor is mounted adjacent each supply means to detect passage of a label therefrom. In addition, each sensor is connected to the supply means and to the roll down assembly so as to cause deactivation of the label supply means while the roll down means is activated in response to the passage of the label from the supply means.

In order to drive the various components of the respective label supply means, a drive motor is mounted in the machine and is adapted for continuous rotation once the machine is actuated. The drive motor connects to the capstan which is used to drive the respective label supply means as well as to the drive shaft for driving each of the take-up rolls of the supply means. This drive motor is actuated at the same time as the stepper motor when the machine is turned on. In addition, a slip clutch is provided between the take-up drive shaft and each take-up drive roller to allow slippage when the backing strip is not being wound.

The index tab which is produced can be of any suitable length, for example, from a 3 inch minimum to a 7½ inch maximum. Also, the height of the individual labels can be ⅝ inch which is sufficient for a full ½ inch high printed number or letter.

In order to operate the system, a format is first programmed so as to set-up the length of an index tab, the number of labels to be applied, the locations at which the labels are to be applied on the tape and the cut-off positions. To this end, the programmer, after determining length of the tab in terms of the number of steps or increments, e.g., 1/16 inch increments, which the machine would make in moving the tab past a given point, determines the number of labels to be applied along with the minimum spacing. Next, the number of increments from the leading edge of the index tab to the location at which each label is to be applied, relative to the centerline of each, is determined to obtain the format. Likewise, the number of increments from the starting point to the centerline of each supply means is determined and programmed in the system. Thereafter, data is fed into the system containing the information of the actual label to be placed on the tabs. The machine then adds the number of increments required to move the tape under the appropriate supply means to the increments for the appropriate label location to obtain the total incremental distance for each label location of the tape from the supply means containing the label to be applied at that location. The machine is then programmed so that the stepper motor is caused to stop at each point corresponding to the total incremental distance of the respective tape locations at which a label is to be applied while the supply means at each such location is activated to dispense a label. The sequence of tape movement is continuous in one direction i.e. a longitudinal path along the supply means while the labels can be applied in a random sequence depending upon the programmed code. The stepper motor continues the same stepper-injecting-stopping action of the tape until the labels have all been applied to the tape. The labelled tape is then wound up or severed into the individual tabs.

The system can be programmed so that a number of labels can be processed at the same time. Further, the labels can be produced as duplicates of each other or can be produced in any sequence, that is, in a numerical or random sequence. The computer which is used to program the sytem operates automatically when turned on. Should power fail during operation, and thereafter return, the program will continue where interrupted. To this end, switches are provided on the front panel of the computer which can be interlocked. This also prevents an operator from changing the program.

The system thus provides an automated method of applying a color code to a series of carriers by placing individual color designations from a plurality of supply means onto predetermined points of each carrier disposed in the same relative positions as the points of the other carriers in response to a programmed relative movement in a given direction between each carrier and the supply means to form color codes on each carrier different from the color codes of the other carriers of the series.

These and other objects and advantages of the invention will become more apparent from the following detailed description and appended claims taken in conjunction with the accompanying drawings in which:

FIG. 3 illustrates a partial view of a pair of roll down assemblies adjacent the respective label supply modules;

FIG. 4 illustrates a view taken on line 4—4 of FIG. 3;

Figure 1:
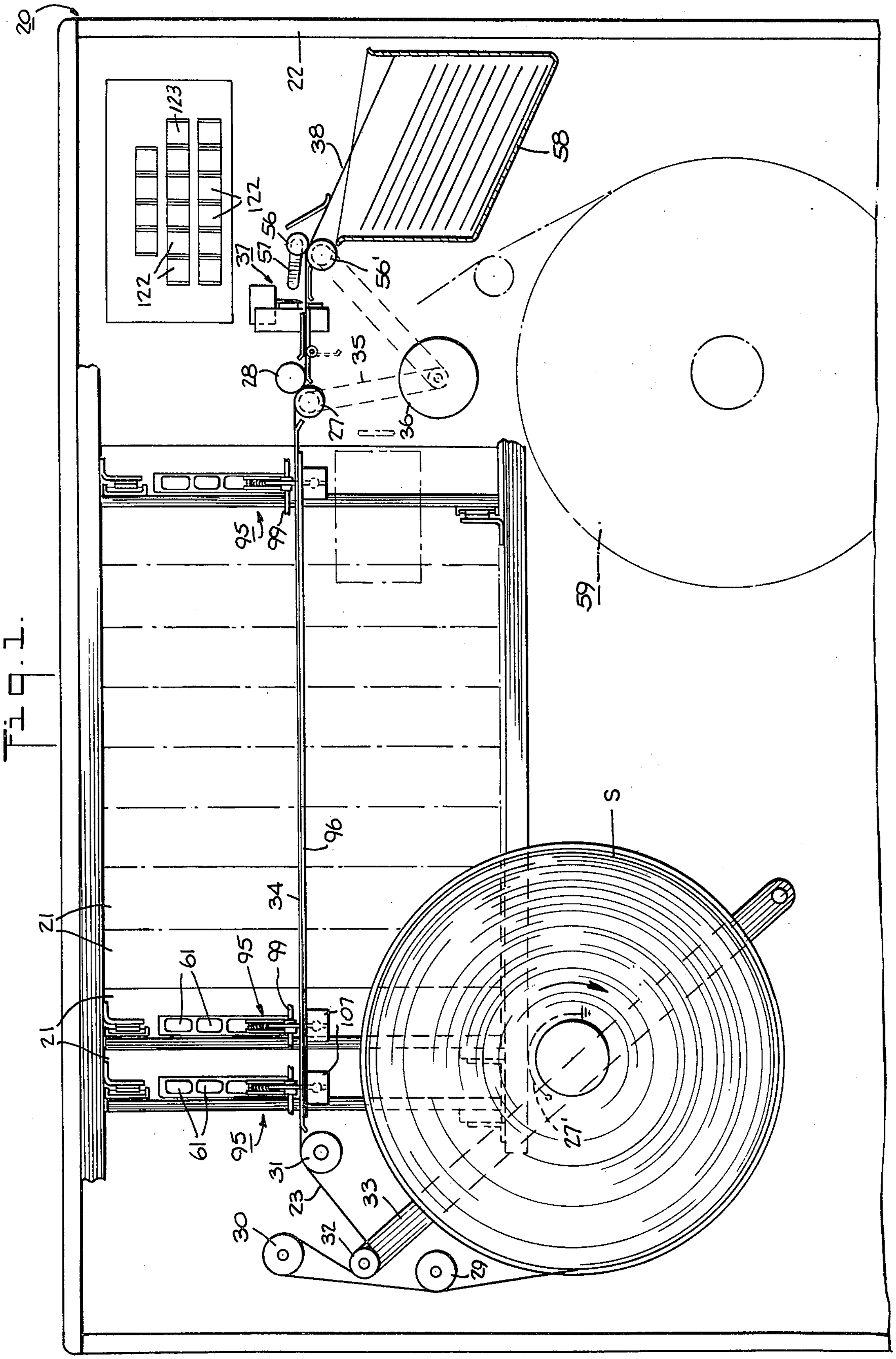
FIG. 1 illustrates a cross-sectional view of the front of a label application machine according to the invention.
Figures 7, 8, 9, 10, 11, 12:
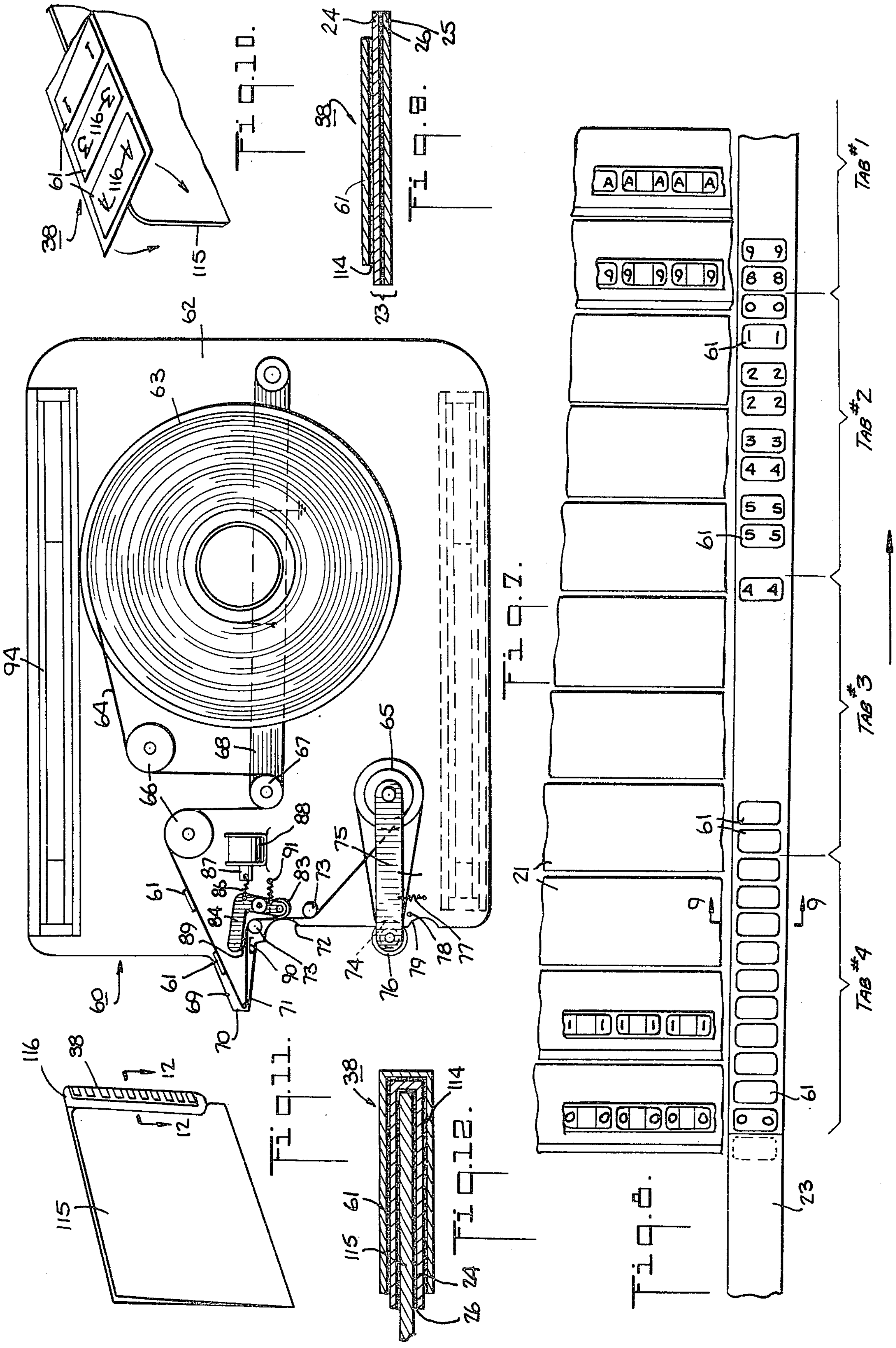
Figure 13:
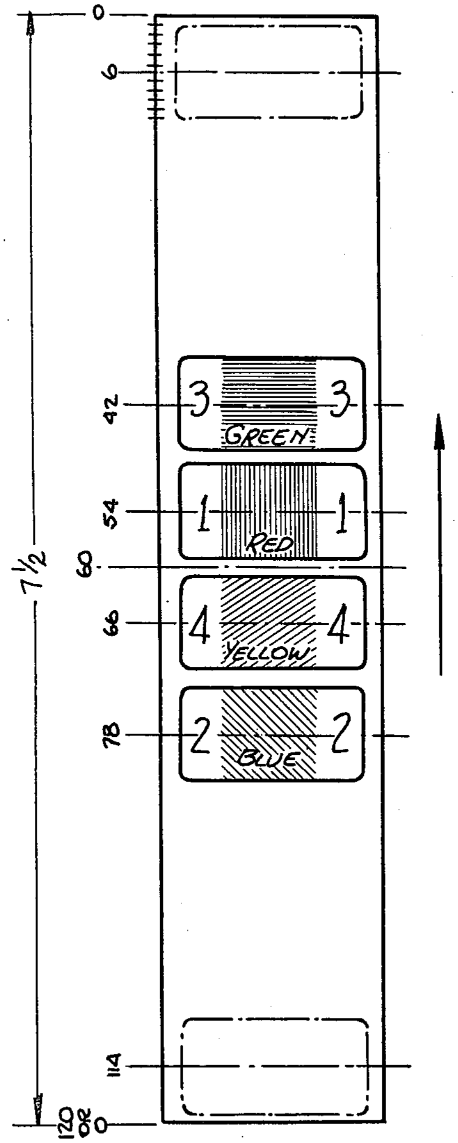
Figure 14:
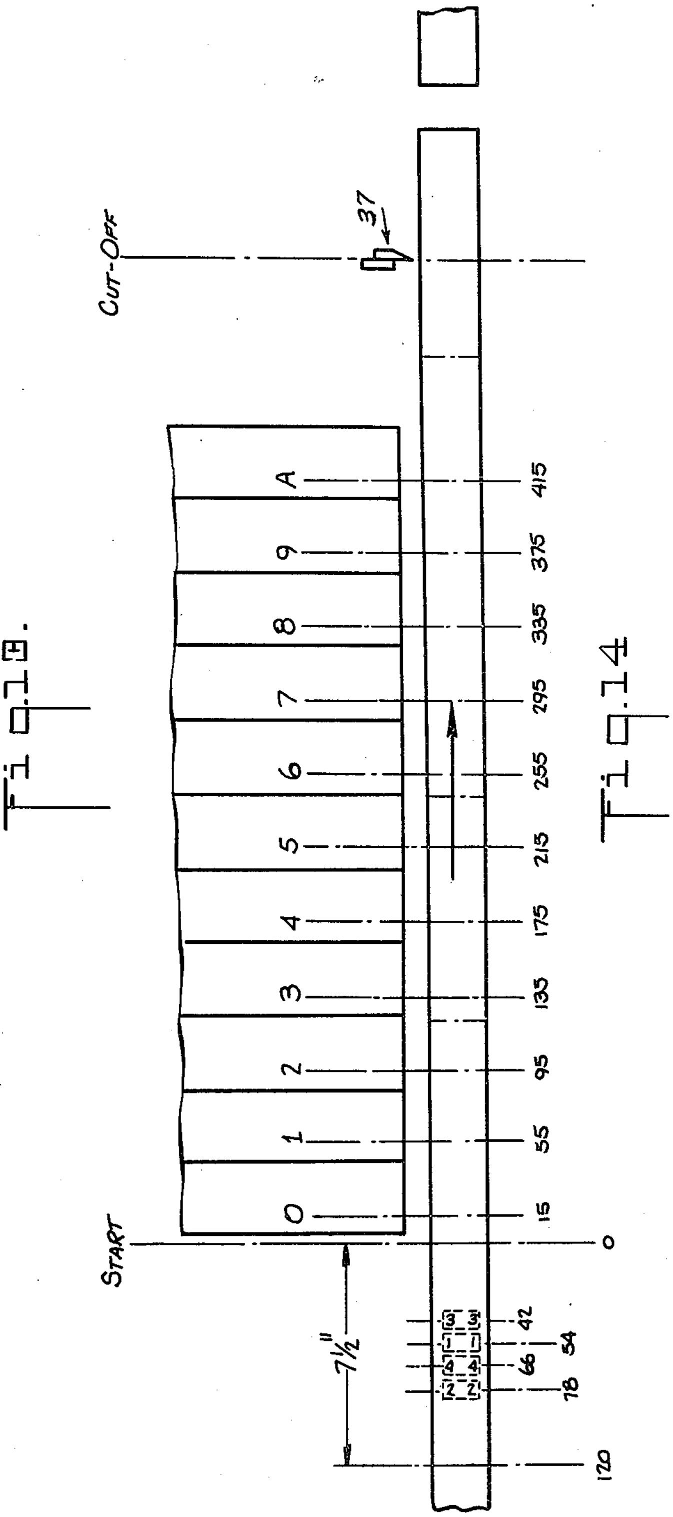
Figure 15:
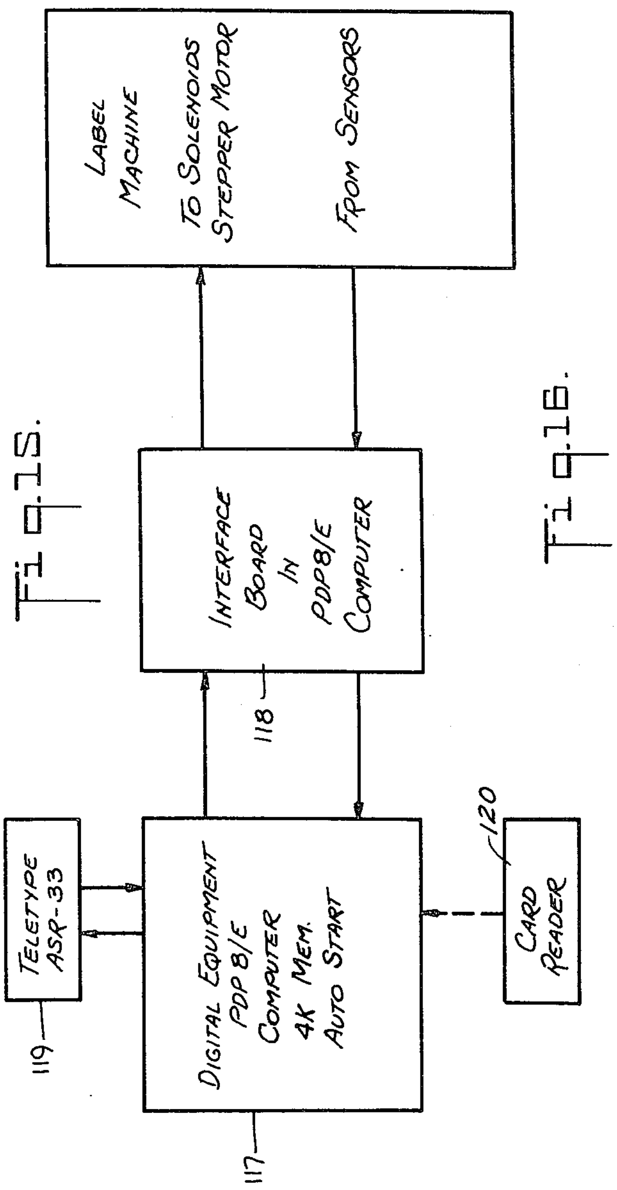
Figure 16:
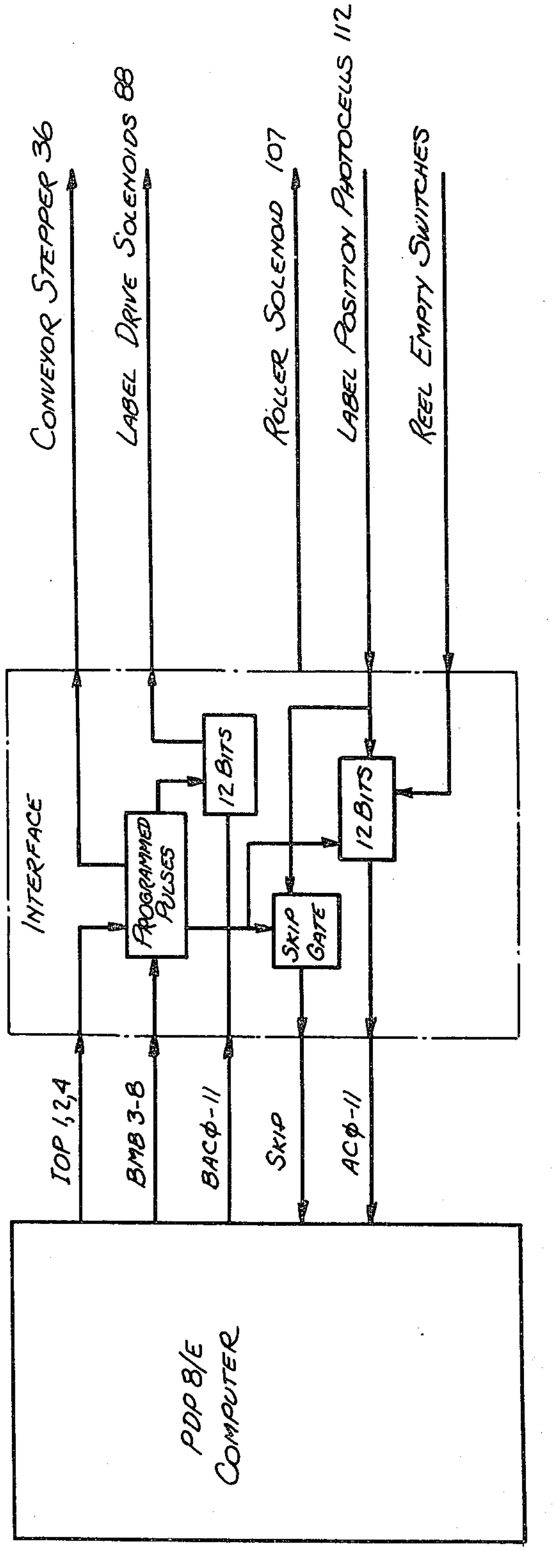
Figure 17:
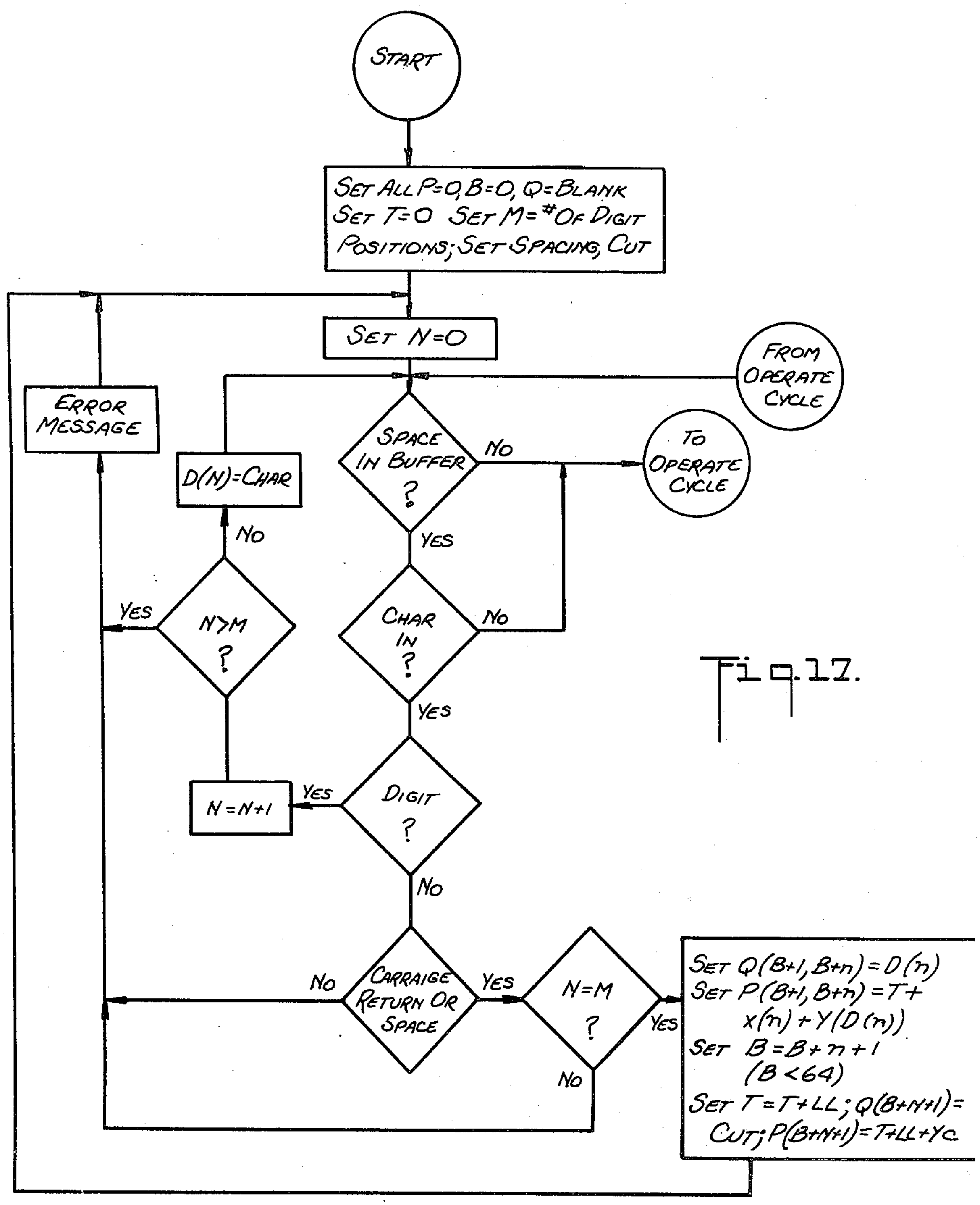
Figure 18:
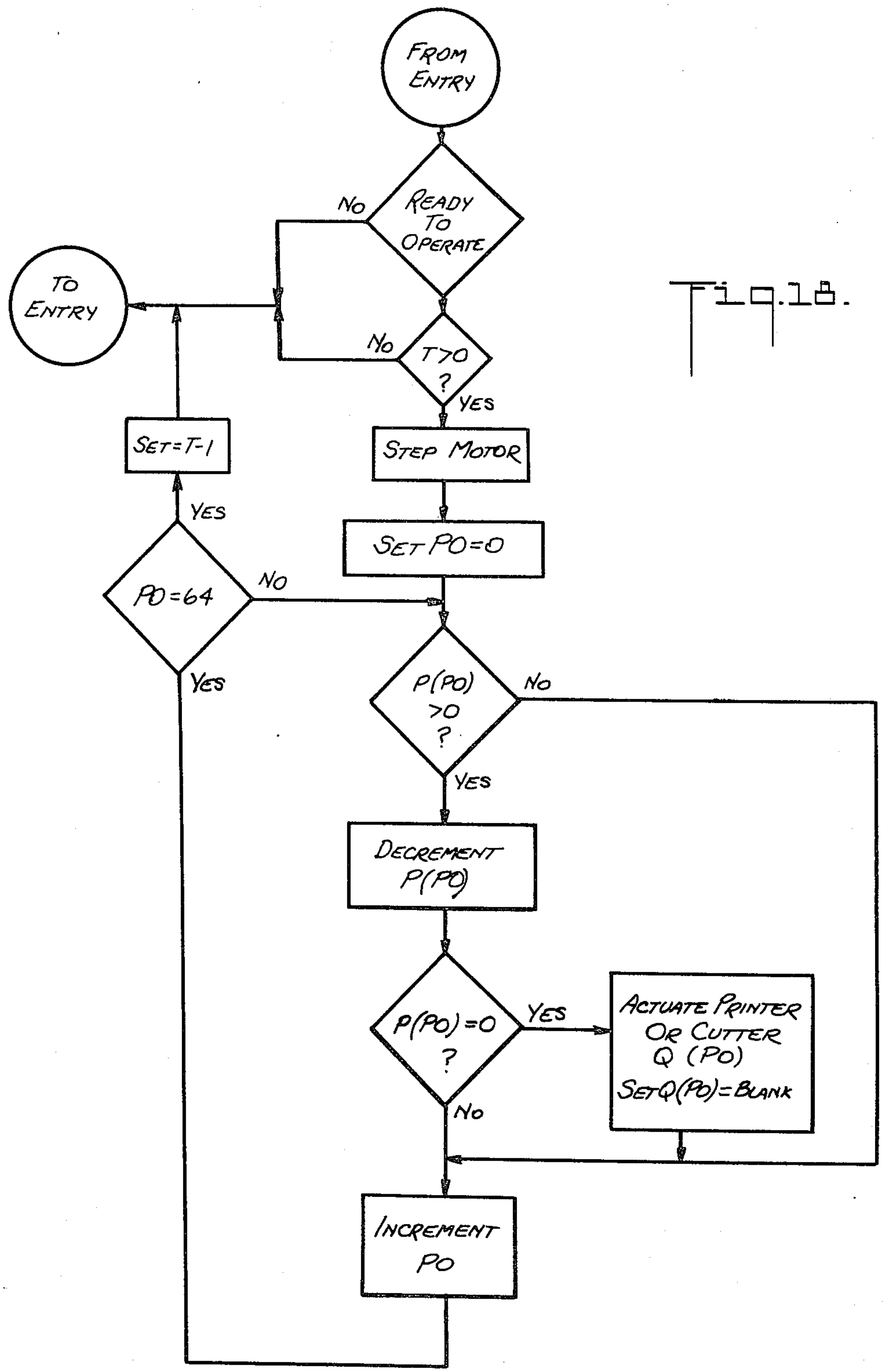
Figure 18:
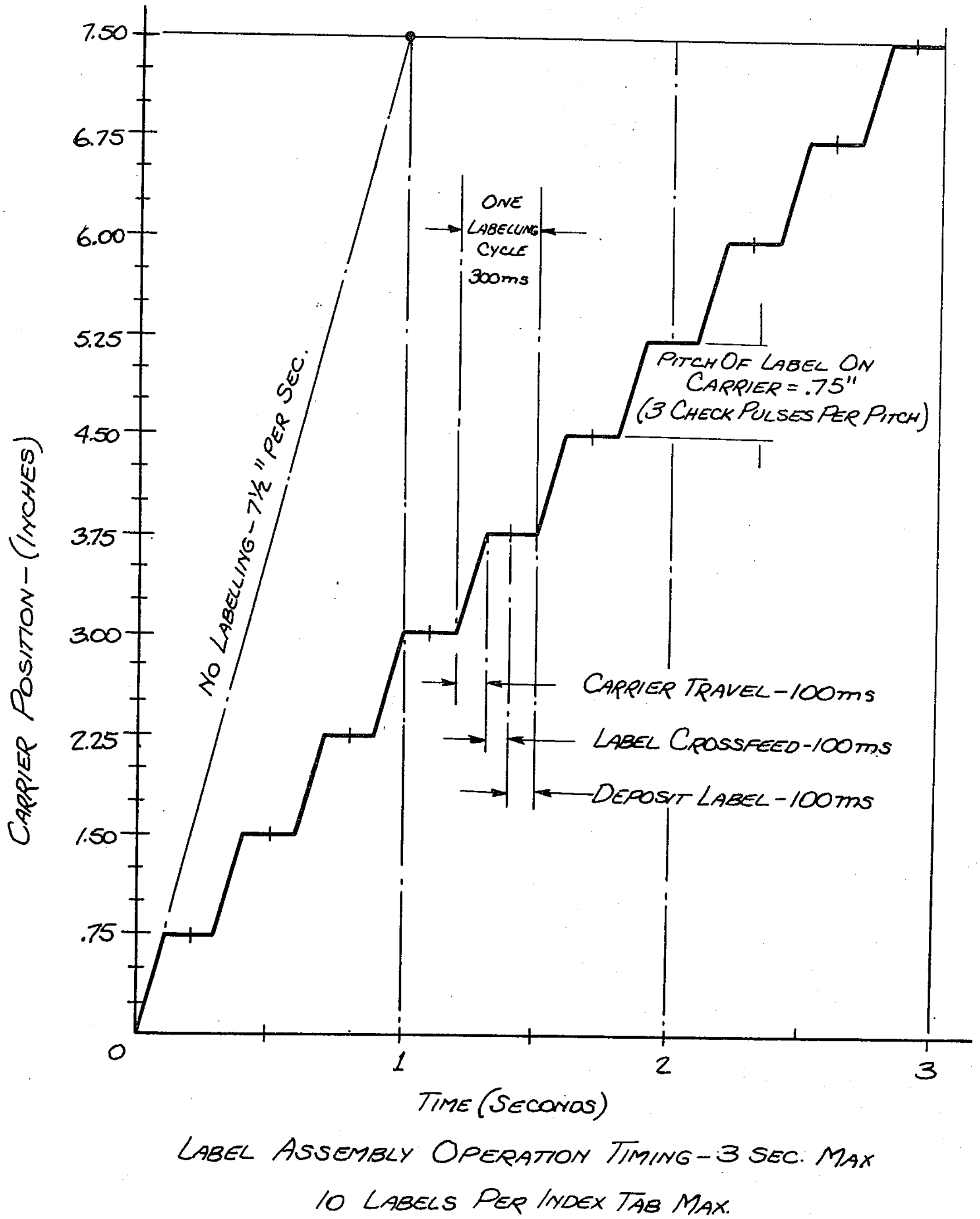

FIG. 5 utilizes a plan view of a cut-off assembly utilized on the label application machine of FIG. 1;

FIG. 6 illustrates a view taken on line 6—6 of FIG. 5;

FIG. 7 illustrates a side view of a label supply module according to the invention;

FIG. 8 illustrates a partial plan view of the machine of FIG. 1;

FIG. 9 illustrates a view taken on line 9—9 of FIG. 8 of the tape;

FIG. 10 illustrates a view of an index tab being applied to a file folder according to the invention;

FIG. 11 illustrates a view of a file folder having an index tab thereon according to the invention;

FIG. 12 illustrates a view taken on line 12—12 of FIG. 11;

FIG. 13 illustrates a partial view of a section of tape from which an index tab is to be made according to the invention;

FIG. 14 illustrates a schematic view of the label application machine of FIG. 1;

FIG. 15 illustrates a flow diagram of the system according to the invention;

FIG. 16 illustrates the block diagram of the system according to the invention;

FIG. 17 illustrates a schematic of the computer program for the entry cycle of the computer according to the invention;

FIG. 18 illustrates a schematic diagram of the operation cycle of the computer according to the invention; and FIG. 19 diagrammatically illustrates a label assembly operating timing sequence according to the invention.

Referring to FIG. 1, the label application machine 20 cooperates with a plurality of label supply means 21 which are removably mounted thereon. The machine 20 includes a machine frame 22 in which a conveyor system is disposed to move a tape 23 past the bank of label supply means 21. As shown in FIG. 9, the tape 23 is composed of a carrier strip 24 and a backing strip 25 with the carrier strip 24 being provided with a self-adhesive coating or layer 26 thereon which serves to removably secure the carrier strip 24 to the backing strip 25.

The conveyor system also includes a driver roller 27 which cooperates with a press roller 28 to move the tape 23 through a guide path formed by a series of guide rollers 29, 30, 31 disposed adjacent to the tape supply roller 24 and a dancing roller 32 disposed between two of the guide rollers 30, 31. The dancing roller 32 is mounted on a spring biased pivotal lever 33 so as to prevent any inertial load of the supply roll 24 from carrying over to the drive roller 27. This allows a faster start-stop operation with less slippage. A strap break 27′ is also attached to the dancing lever 33 to stop the supply roller 24 from spilling out tape 23 when the tape 23 is not being unwound. In addition, a table 34 is secured to the machine frame 22 between the guide roller 31 and the drive roller 27 to define a flat horizontal surface over which the tape 23 slides past the label supply means 21. The table 34 can be provided with bevelled ends so as to avoid any sharp corners which would damage the tape 23.

The drive roller 27 is connected by a suitable transmission 35 to a stepper motor 36, such as a slo-syn No. HS-50, which permits stopping of the tape 23 during movement across the table 34 in a programmed sequence of steps.

Referring to FIGS. 1, 5 and 6, the machine 20 also includes a cutoff assembly 37 positioned downstream of the drive roller 27 for severing the tape 23 into individual index tabs 38. The cutoff assembly 37 includes a bed 39 which is fixedly mounted in the machine frame 22. In addition, a fixed knife edge 40 is secured, as by bolts 41, to the bed 39 to extend under and support the tape 23 while a pivotal knife edge 42 is pivotally secured at one end to the fixed knife edge 40 by a suitable bolt 43 so as to extend over the tape 23. As shown in FIG. 5, the bolt 43 passes through the bed 39 and has a pair of washers 44 disposed thereon along with a threaded nut 45 which serves to compress a tensioning spring 46 between the washers 44. In this way, the bolt 43 can be tightened so as to ensure a clean cut by the knife edges 42, 40.

As shown in FIG. 6, a solenoid-type actuator 47, such as a Guardian No. 4 HD-DC actuator is mounted on the bed 39. This actuator 47 includes a reciprocally mounted piston 48 which is secured to a lever 49 by a suitable hinge pin 49′. The opposite end of the lever 49 is secured to a spring 50 which, in turn, is fixed on the bed 39. The spring 50 serves to bias the lever 49 in a direction away from the actuator 47. In addition, a pair of levers 51 are pivotally mounted on the bed 39 by a suitable pin 52 and to the lever 49 by a pin 53. Likewise, a pair of levers 54 are hinged by the pin 53 to the lever 49 and by a pin 55 to the pivotal knife edge 42.

In operation, upon actuation of the actuator 47, the piston 48 is retracted into the actuator 47. This causes the lever 49 to move to the right, as viewed in FIG. 6, thereby extending the spring 50 and moving the knife edge 42 downwardly to sever the tape 23. Upon deactivation of the actuator 47, the spring 50 pulls the lever 49 away from the actuator 47 causing the knife edge 42 to return to the uppermost position as shown in dotted lines.

Referring to FIG. 1, the cutoff assembly 37 cooperates with a pair of delivery rollers 56, 56', one of which is connected to the stepper motor 36 to be driven in synchronism with the drive roller 27 and the other of which is pivotally mounted on a lever 57 so as to press against the lowermost roller 56'. These delivery rollers serve to eject a severed index tab 38 from the cutoff assembly 37, for example, into a hopper 58 mounted downstream of the cutoff assembly 37. As shown, the hopper 58 is sized to receive a stack of index tabs 38. This hopper 58 can also be adjustable to receive different sized tabs.

Referring to FIG. 1, instead of utilizing a cutoff assembly, a take-up roll 59 can be mounted as shown in dotted line on a suitable shaft of the machine frame 22 downstream of the drive roller 27 so as to wind up the labelled tape 23.

Figure 2:
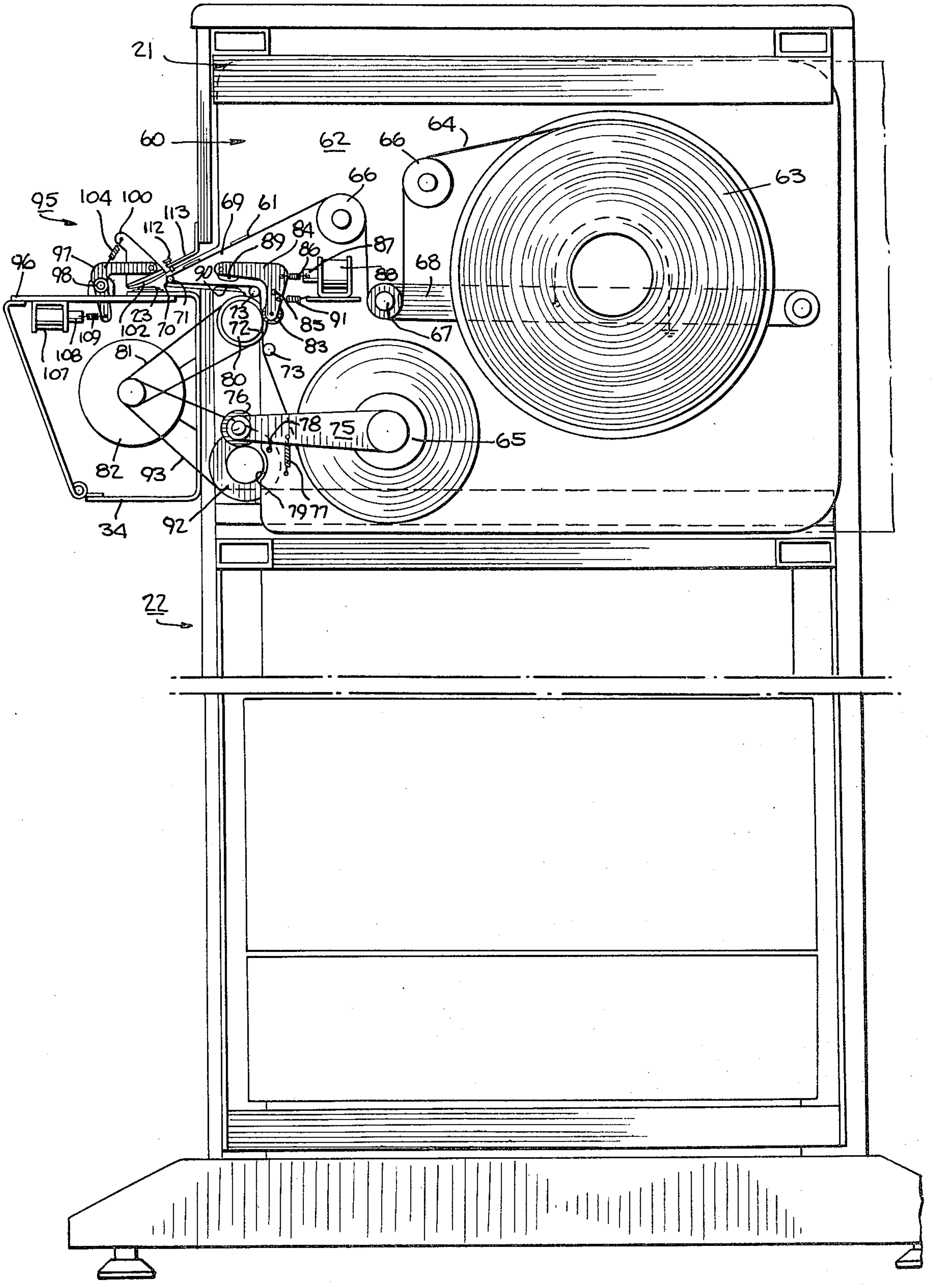
FIG. 2 illustrates a cross-sectional view of a label supply module according to the invention in place on the machine of FIG. 1.

Referring to FIG. 2, each label supply means 21 is formed of a module 60 which is removably mounted within the machine frame 22. Each module 60 is sized so as to slide within a suitable compartment of the machine frame 22 so as to dispense a label 61 at a dispensing station adjacent the tape 23.

Referring to FIG. 7, each module 60 includes a housing 62, for example, of metal or plastic construction, of relatively thin thickness and of rectangular shape. In addition, a supply roll 63 is mounted on a suitable shaft within the housing 62. The supply roll 63 includes a tape composed of a flexible backing strip 64 on which a plurality of spaced parts semi-rigid labels 61 are removably secured by a self-adhesive on the backs of the labels. In addition, a take-up roller 65 is mounted within the housing 62 to take-up the backing strip 64 after the labels 61 are dispensed from the module 60. Also, a pair of guide rollers 66 are rotatably mounted within the housing 62 to form a guide path along with a dancing roll 67. The dancing roll 67 is disposed on an arm 68 which is pivotally mounted within the housing 62 and serves a similar purpose to the dancing roll 32 described above with respect to FIG. 1. In addition, the arm 68 is spring biased and a brake is applied about the supply roll 63 to prevent spilling off of the tape.

The housing 62 is provided with a nose-like projection 69 at a forward end which includes an opening 70 for dispensing of a label 61 therethrough. In addition, a peel-off rod 71 is fixedly mounted within the projection 69 adjacent to the opening 70. Also, a second opening 72 is formed in the forward portion of the housing 62 below the projection 69. This opening 72 has a curvilinear profile and is positioned between a pair of guide rollers 73 which serve to guide the backing strip 64 by the opening 72. A third opening 74 is formed in a lowermost portion of the forward wall of the housing 62 so as to permit passage of a pair of arms 75 on which a drive roller 76 is mounted outside the housing 62. The arms 75 include a suitable transmission (not shown) which operably connects the drive roller 76 to the take-up roll 65. In addition, a spring 77 is fixed to the housing 62 and to at least one of the arms 75 so as to bias the arms 75 in a downward direction against a stop pin 78. Also, a recess 79 of curvilinear profile is provided within the housing wall below the opening 74 for purposes described below.

The guide rollers 66, 73 and the peel-off rod 71 are disposed so that the backing strip 64 is guided around the peel-off rod 71 at a sharp angle to cause the backing strip to peel from the semi-rigid labels upon passing down and around the rod 71.

Referring to FIG. 2, in order to move the backing strip 64 within each module 60, a common capstan shaft 80 is rotatably mounted within the machine frame 22 at a position below the respective projections 69 of each module 60 and within the recesses 72 of each. This capstan 80 is connected, e.g. by a transmission belt 81 to a drive motor 82 in a suitable manner. The motor 82 operates continuously when the machine 20 is activated so as to continuously drive the capstan 80. Additionally, a press roll 83 is rotatably mounted on a two-arm lever 84 within the housing 62 of each module 60. The two-armed lever 84 is pivotally mounted about a pin 85 and is connected by a spring 86 secured above the pin 85 to a retractable piston 87 of an actuator 88, such as a solenoid. The lever 84 is disposed so that upon retraction of the piston 87 into the actuator 88, the lever 84 pivots about the pin 85 so that the press roller 83 pushes the backing strip 64 through the recess 72 into engagement with the capstan 80. The backing strip 64 is then driven through the nip formed by the press roll 83 and capstan 80.

In addition, a brake shoe 89 is mounted on the lever 84 so as to move towards a stationary brake shoe 90 in the housing 62 to clamp the backing strip 64 therebetween when the actuator 88 is deactivated. For these purposes, a spring 91 is secured to the lever 84 below the pivot pin 85 and to the housing 62 so as to retract the lever 84 in a positive manner.

A common take-up drive shaft 92 is als rotatably mounted in the machine frame 22 to project into the recess 79 of each module 60 and to engage with each respective drive roller 76. This take-up drive shaft 92 is driven from the motor 82 by a suitable transmission 93 in synchronism with the capstan 80. The spring 77 serves to maintain contact between the drive roller 76 and the drive shaft 92 at all times. However, in order to prevent winding up of the backing strip 64 when the brake 89 is activated, the drive roller 76 is provided with a slip clutch (not shown) so as to allow slippage between the drive shaft 92 and the drive roller 76.

Referring to FIG. 7, each module housing 62 is provided with a suitable slide assembly 94 on each side so as to facilitate positioning of the module 60 within the machine frame 22. Also, each module has a suitable switch therein for detecting when the label supply roll is exhausted and requires replacement.

Referring to FIGS. 1 to 4, a plurality of label roll down assemblies 95 are positioned in opposition to each respective label supply means 21 over the tape 23.

Referring to FIG. 4, each roll down assembly 95 is secured to a flat plate 96 extending along the machine frame 22 (not shown) under the table 34. Each assembly 95 includes a pair of two armed levers 97 which are pivotally mounted by means of an anti-friction bearing 98 in common on a shaft 99 mounted on the plate 96 by means of suitable supports 99'. In addition, a T-shaped block 100 is disposed between a pair of levers 97 and is pivotally mounted on a pin 101 passing though the arms of each lever 97. The press block 100 includes a pressing face 102 which is of elongated width. The block face 102 can be formed of any suitable material, such as a resilient material, and can be backed by a suitable backing plate 103 of rigid construction. A spring 104 is fixed to the press block 100 about a pin 105 and is secured to at least one of the levers 97 so as to bias the block 100 in a counterclockwise direction as shown. In addition, a stop pin 106 is secured on the press block 100 so as to limit counterclockwise rotation of the press block 100 relative to the lever 97.

In addition, the assembly 95 includes an actuator 107 of similar construction to the actuator 88 described above for pivoting of the levers 97. The actuator 107 includes a retractable piston 108 which is connected by a spring 109 to one end of the lever 97. In addition, a spring 110 is secured at an intermediate point of the levers 97 and to a fixed pin 111 disposed on the underside of the plate 96. In operation, the actuator 107 serves to retract the piston 108 so as to pivot the levers 97. This causes the press block 100 to move downwardly towards the table 34 so as to press a dispensed label 61 against the tape 23. Upon deactivation of the actuator 107, the spring 110 serves to pivot the levers 97 in the opposite direction causing the block 100 to raise above the tape.

The dimensions of the press block 100 and the press face 102 relative to a label 61 are such that the label 61 can be dispensed from a module 60 from a point adjacent the peel-off rod 71 therein and applied to the tape 23. As shown in FIG. 4, a label 61 projects out of the module 60 to a point near the far edge of the carrier strip 24 of the tape 23. Upon actuation of the roll down assembly 95, the press block face 102 initially engages the label near this edge and then travels across the label so as to secure the label 61 to the carrier strip 24 of the tape 23.

Referring to FIGS. 2 and 4, a sensor 112 such as a photoelectric cell is mounted by means of a bracket 113 on the machine frame 22. The sensor 112 is electronically connected to the actuator 88 of the adjacent module 60 and to the actuator 107 of the adjacent roll down assembly 95. In operation, as a label 61 passes by the sensor 112, the sensor 112 emits a signal so as to actuate each actuator 88, 107 in sequence. To this end, the actuator 88 is deactivated so that continued motion of the backing strip 64 is braked by the brake 89 while the press block 100 is moved against the label 61 by actuation of the actuator 107. The actuator 107 is further timed so as to be deactivated after a predetermined length of time sufficient for the press block 100 to travel across the label 61. Thereafter, the actuator 107 is automatically deactivated so that the roll down assembly 95 is retracted. In this way, the tape 23 can continue movement along the table 34.

Referring to FIG. 9, each index tab 38 comprises a label 61 adhesively secured by an adhesive layer 114 to the carrier strip 24 of the tape 23.

Referring to FIG. 10, each label 61 has an exposed face of a predetermined color as well as a pair of symmetrically placed indicia 116. In order to use the index tab 38, the backing strip 25 is removed to expose the adhesive layer 26. Thereafter, the tab 38 is folded about the edge of a file folder 115 along the centerline so as to position one indicia 116 to each side of the folder 115 while providing an edge of color. The indicia 116 and the color correspond to each other, such that, for example, the color green corresponds to the number 4; the color red corresponds to the number 1; and the color blue corresponds to the letter A. Any combination of colors can be used with a combination of numbers and/or letters used in the system.

Referring to FIGS. 11 and 12, the labels 61 are of a width less than the carrier strip 24 and are spaced along the carrier strip 24. Further, the adhesive layer 26 on the carrier strip 24 serves to secure the tab 38 to the file folder 115. The file folder 115 can be of any suitable construction such as a folded over file jacket with a tab 116 extending therefrom to which the index tab 38 is applied for viewing purposes when the file folder 115 is disposed with the edge exposed.

In order to place the respective labels 61 on the carrier strip 24 on the tape 23 in the proper places, the stepper motor 36 of the conveyor system and the actuator 88 of each modular supply means 21 is programmed in a manner as described below.

Referring to FIGS. 13 and 14, the code to be placed upon the index tab to be produced is first determined in any suitable manner. For example, as shown in FIG. 13, the code —3142— is to be placed on the index tab 38. This code corresponds to a sequence of colors in which 1 is red; 2 is blue; 3 is green and 4 is yellow. As noted above, the labels 61 are preprinted and precolored.

After the desired code has been determined, it is necessary to positively locate the places on the tape 23 on which the respective labels 61 are to be placed corresponding to this code. In addition, the size or lengtha of the index tab is determined. For example, as shown in FIG. 13, the length of the desired index tab is 7½ inches. For increments of 1/16th of an inch, the total number of such increments in the tab is 120. For a given label width of ⅝ of an inch or 10 increments and a spacing of ⅛ of an inch or 2 increments, the labels 61 are to be placed about the center of the index tab at locations corresponding to increments of 42, 54, 66 and 78 from the head of the tape.

After the above increment locations have been determined, the increment stations of each of the label supply means 21 relative to the centerlines thereof is determined. As shown in FIG. 14, the stations for each of the supply means 21 is noted thereon. For example, the supply means for the label 3 is at station 135; for label 1 at station 55; for label 4 at station 175; and for label 2 at station 95.

In order to determine the total incremental distance the tape must follow from a zero starting point until a label application location on the tape is located under the correct label supply means, the two increment distances are added. For example, in order to correctly place the tape under the supply means for the label 3, the tape must move a total number of increments of 42 + 135 or 177 increments. Similarly, for label 1, the tape must move 109 (54 + 55) increments; for label 4 a total of 241 (66 + 175) increments; for label 2 a total of 713 (78 + 95) increments. Further, in order for the tape to reach a cutoff position, the tape must move a total of 120 increments (i.e. 7½ inches) plus the number of stations through the machine which, in this case, is 535. The total incremental distance is therefore 655. Thus, each location or point on the carrier which is to receive a label is determinative of the amount of relative movement between the carrier and label supply means required for activation of a respective supply means.

Referring to FIG. 14, in order to apply the labels 61, the stepper motor 36 begins a cycle as the tape passes the starting point O as shown in FIG. 14. The stepper motor 36 then moves the tape a distance needed to position the tape below the first label to be applied, e.g. for the given example, 109 increments. The tape is then stopped as the motor is deactivated. At this same time, the supply means 21 for the number 1 label is actuated and a label 61 is dispensed at increment station 55. The stepper motor then starts up until reaching the next incremental distance 177 at which the second label is to be applied. At this time, the label supply means for the number 2 is activated and a label is dispensed at station 95. Successive operations are then carried out so that the label —3— is disposed at station 135 when the stepper motor has incremented 177 steps and the label —4— is dispensed at station 175 when the motor has incremented 241 steps. After the motor has incremented 655 steps, the cutoff assembly 37 is activated so as to sever the index tab 38 from the tape 23.

Referring to FIG. 15, in order to program the label machine 20 and the respective label supply means 21 (not shown) a computer 117 such as a PDP 8/e computer, as referred to above, having an interface 118 as is known is utilized. Initially, the computer 117 is provided with an executive program in which all the control and positioning information for the label machine 20 and respective supply means 21 is contained. When placed in use, the computer 117 is first provided with a format program which is delivered, for example, through a teletype 118 or through a card reader 120. The format program contains the information concerning the length of a label in terms of the number of increments for the label to pass by the start position under the driving force of the stepper motor as well as the information concerning the number of labels to be applied, the positions at which labels are to be applied to the carrier strip of the moving tape and the cut-off position. The position and spacing of the various labels is determined by the programmer. For the above described example, the format program includes the five positions of 42–54–66–78–120 which represents the spacing for the four labels to be applied and the cutoff position. This format program can then be locked in the computer by use of suitable keys on the computer itself. In this way, once the format program has been locked into the computer, all subsequent operations of the computer for applying labels onto a travelling carrier tape can proceed without error.

After the format program has been keyed into the computer 117, data containing the information of the actual labels to be applied at the locked-in positions is delivered to the computer 117. This data is delivered to the computer 117 in a similar manner as above through a teletype 119 or card reader 120. The data includes the code to be applied, e.g. the number 3142, as well as a terminator to indicate the end of the code. The computer receives the data and converts the data into step intervals. For example, for the number 3142 and a terminator, the computer converts this into the values of 135, 55, 175, 99 and 535, each of which corresponds to the positions of the label supply means for the digits 3, 1, 4, 2 and the position of the cutoff assembly.

Thereafter, the step intervals obtained from feeding in the data are combined with the step intervals of the format program to provide the actual code for the machine to place the correct labels in the correct positions on the travelling carrier tape.

Subsequent data can be delivered to the computer in sequence. To this end, each is provided with a code number which delays each for a time equivalent to a predetermined number of increments of the stepper motor. For example, the second set of data is entered to become effective only after the stepper motor has moved the tape 115 increments which is a distance slightly less than the total length of a tape segment to be made into an index tab. In this way, successive codes (see FIG. 8) can be placed on the tape without interference with the code before or after it. Generally, the computer store is sized so as to have a capacity to handle the information for four index tabs at a time. For example, the computer referred to above has 64 positions within the store to receive the coded information.

During operation, once the computer has been turned on along with the labelling machine 20, the stepper motor 36 and drive motor 82 begin to move. As the stepper motor 36 moves through the various stepped positions, the computer receives signals therefrom so as to decrement the coded information in steps of one. When the code is decremented a sufficient number so that a zero appears within the combination of porgrammed distances for a given index tab, the computer delivers a signal to the stepper motor to stop the motor. At the same time, a signal is directed to the actuator 88 (see FIG. 2) of the label supply means 21 which is to deliver the label corresponding to the code in the computer. This latter signal causes the actuator 88 to move the pressure roller 83 against the common capstan 80 connected to the constantly rotating motor 82. The tape is then driven about the peel-off rod 71 so that a label 61 projects from the opening 70 in the console 60 across the carrier strip 24 of the tape 23. Upon detecting the passage of this label 61, the sensor 112 emits a signal to the computer which then causes the computer to deactivate the actuator 88 so that the brake 89 is brought against the brake shoe 90 stopping any further movement of the backing strip 64. At the same time, the actuator 107 for the adjacent press down assembly 95 is actuated by the computer so as to press the label 61 onto the carrier strip 24 via the press block 100. After a predetermined time, the actuator 107 is deactivated. This allows the press block 100 to retract. Thereafter, the stepper motor 36 is reactivated.

When the next zero position occurs within the code a similar operation then follows.

The operation of the computer with respect to the labelling machine is such that the computer is able to stop the stepper motor in each of the positions necessary to apply the labels to the tape and to permit cutoff of the label as well as to actuate the correct label supply means to dispense the correct label at the correction station.

The computer is also connected to each of the modules so as to receive a signal from the reel-empty switches located in each so as to deactivate the computer should a label not be in the module for dispensing.

Referring to FIGS. 16, 17, and 18, a flow chart is illustrated for the operation of the computer, the labelling machine and label supply means. The flow chart of FIGS. 17 and 18 illustrate the various logic programs carried out by the computer at the start and during operation. Further explanation is not believed to be required. The key for the symbols utilized in FIGS. 17 and 18 as follows:

KEY

D = digit
n = position of digit in data record
m = maximum number of digit positions
$X_n$ = position on label of digit $n$ in number of steps
$Y_D$ = position of label maker $D$ in number of steps
P = digits in buffer contents of P = steps remaining before next printing, this digit Q = same number of registers as P; digits B = buffer input pointer PO = operation pointer LL = length of label in steps T = time to start of label now being entered $Y_c$ = position of cutter Referring to FIG. 19, the timing operation of the system is graphically illustrated. In this case, the operating cycle is illustrated for an index tab having a length of 7½ inches with 10 labels applied thereon. Should no label be applied to the travelling tape, the tape would move 7½ inches past the start position in one second as illustrated by line A. However, when labels are applied, the tape travels in a sequence as illustrated by line B. Line B illustrates a sequence wherein ten labels can be applied. Should a less number of labels be applied, the line would be characteristic of such. As shown, the time for a labelling cycle is 300 milliseconds.

A suitable control panel 121 (FIG. 1) is mounted in the frame 22 of the label application machine 20 and is provided with a series of signal lights which are electronically connected to the computer so as to indicate the cycle and components of the system in operation. The signal lights 122 are also used to indicate when a label supply module 60 is empty while another light 123 indicates when the carrier tape supply is exhausted or nearly so.

The invention thus provides a system in which color-coded index tabs can be rapidly prepared for subsequent application to a file folder or holder. Because of this, the overall costs of a color coded filing system can be substantially reduced in the terms of time and labor. Furthermore, since the computer provides for an automated system, the otherwise tedious task of making up index tabs by hand is avoided.

The system of the invention can be incorporated with any other suitable machinery so that a labelling machine, as described above, can be utilized with other components so as to automatically place the prepared index tabs directly onto a file folder. In this way, the system can be utilized to completely automate a file preparation operation.

It is noted that the index tabs which are prepared by the system can be custom made to suit a file system. For example, as the carrier tape on which the individual labels are applied can be of a single width, the labels can be made of different sizes within the width of the carrier strip. Further, the placement of the labels on the carrier tape need not be carried out in a symmetrical fashion. In this way, there is no need to change the supply spool of tape within the labelling machine when different sized labels are to be used. When necessary, the supply spools or carrier tape can also be made of greater or less widths and the roll down assemblies may be mounted in adjustable manner to coact with the different widths.

Further, should an excessive number of labels positions be required, the computer can be easily programmed to provide for a greater length of index tabs along with a greater number of label positions.

Still further, the system can be used to produce a large number of labels having different filing codes at one time. For example, in order to program ten thousand serial numbers for a given filing operation, the information regarding each of the numbers of the series can be placed on a suitable teletype tape at one time and fed into the computer. The labelling machine can then prepare the index tabs corresponding to the codes within a very short period of time.

Also, the system can be used to apply the individual labels directly to a file such as a file card which is conveyed past the respective modular supply means. In such a case, the labels can be applied so as to overhang the card. The free end of the label would thereafter be folded about the edge of the card by a suitable means.

Further, the tape onto which the labels are mounted can also be in the form of a transfer belt. In such a case, the labels could be applied to project from one edge of the belt so as to be transferred onto a file folder or holder directly without the intermediary of a carrier strip. Also, the file folders can be conveyed directly under the label supply means via a suitable conveyor so as to receive the labels directly.

What is claimed is:

1. A method of making color-coded index tabs comprising the steps of moving a carrier tape through a predetermined path having a plurality of stations therein from a predetermined start position;

stopping the moving tape in said path at a plurality of predetermined distances from said start position;

applying a color-coded label from a selected one of a plurality of label supply means to the carrier tape in response to the stopping of the tape at each predetermined distance from said start position, each label supply means being located at a respective one of said stations and each label being applied at a different location on the tape to form a non-repeating pattern of color-coded labels on said tape; and receiving the tape with the color-coded labels thereon at a point downstream of said start position.

2. A method as set forth in claim 1 which further comprises the step of severing the tape with the labels thereon at predetermined points relative to said start position to form individual index tabs of the severed portions with each tab having a color code different from the color codes of the other tabs.

3. A method as set forth in claim 1 which further comprises the step of pressing each label applied to the carrier tape onto the carrier tape.

4. A method as set forth in claim 1 wherein the tape is moved in a single direction from said start position with the labels of each tab being applied to the tape in a sequence corresponding to the movement of the tape from said start position.

5. A method of color-coding a series of files comprising the steps of conveying a series of files sequentially through a predetermined path having a plurality of stations therein from a start position;

stopping each conveyed file in said path at a plurality of predetermined distances from said start position, each said file being stopped at predetermined distances different from the other of said files;

applying a color-coded designation from a selected one of a plurality of supply means to each file in response to the presence of said file at each respective predetermined distance from said start position, each supply means being located at a respective one of said stations and each designation being applied at a different location on a file whereby each file is provided with a color code different from the other files; and receiving said file with the color-coded designation thereon at a point downstream of said start position.

6. A method of color-coding a series of carriers comprising the step of applying a color code to each carrier of a series of carriers to form a color code on each carrier different from the color codes of the other carriers of said series, each color code being formed by placing a plurality of individual color designations from a plurality of supply means, at different times during application of each color code, onto predetermined points of each carrier disposed in the same relative positions as the points of the other carriers in response to a programmed relative movement in a given longitudinal path along said supply means between each carrier and the plurality of supply means, each said point being determinative of the amount of relative movement required for activation of a respective supply means.

7. A method as set forth in claim 6 wherein each carrier is moved past the supply means.

8. A method as set forth in claim 6 wherein the designations are individual labels.

9. A method as set forth in claim 6 wherein the carrier is selected from the group consisting of a tape having a carrier strip and a backing strip removably secured thereto, a file card, a transfer belt, a file folder and a file holder.

10. A method of color-coding comprising the steps of positioning a plurality of supply means for dispensing color designations along a predetermined path, at least some of said supply means dispensing color designations of different color from the remaining supply means;

moving a series of carriers in a given direction past said supply means, each carrier containing a plurality of points to receive color designations, said points of each carrier being disposed in the same relative positions as the points of the other carriers; and actuating selected ones of said supply means at different times during movement of each carrier in said direction to apply respective color designations onto predetermined points of said points of each said carrier in response to the positioning of each respective one of said predetermined points at a respective selected supply means to form color codes on each carrier different from the color codes of the other carriers of said series and in the same relative positions.

11. A method as set forth in claim 10 which further includes the step of synchronizing the movement of each carrier and the actuation of each supply means with a computer program.

12. A method as set forth in claim 10 wherein each carrier is selected from the group consisting of a tape having a carrier strip and a backing strip removably secured thereto, a file card, a transfer belt, a file folder and a file holder.

13. An automated method of color-coding comprising the step of applying a color code to each carrier of a series of carriers by placing individual color designations from a plurality of supply means onto a plurality of predetermined points of each carrier disposed in the same relative positions as the points of the other carriers in response to a computer program wherein selected supply means are activated at different times during application of each color code to supply a color designation onto selected points of each carrier in response to positioning of respective selected points at respective selected supply means during movement of each carrier in a given direction past the plurality of supply means to form a color code on each carrier different from the color codes of the other carriers and in the same relative positions.

14. A method of color-coding a series of files comprising the steps of conveying a series of files sequentially through a predetermined path having a plurality of stations therein from a start position;

locating each conveyed file in said path at a plurality of predetermined distances from said start position, each said file being located at predetermined distances different from the other of said files;

applying a color-coded designation from a selected one of a plurality of supply means to each file in response to the presence of said file at each respective predetermined distance from said start position, each supply means being located at a respective one of said stations and each designation being applied at a different location on a file whereby each file is provided with a color code different from the other files; and receiving said file with the color-coded designation thereon at a point downstream of said start position.

15. A method of making color-coded index tabs comprising the steps of positioning a plurality of supply means for dispensing color coded indicia along a predetermined path, at least some of said supply means dispensing color-coded indicia of different color from the remaining supply means;

moving a tape having sections to define index tabs in one direction past said supply means, each section containing a plurality of points to receive color-coded indicia during movement through said path, said points of each section being disposed in the same relative positions as the points of the other sections; and actuating selected ones of said supply means at different times during movement of each section of the tape past said plurality of supply means in said one direction to apply respective color-coded indicia onto predetermined points of said points of each said section, each said selected supply means being actuated in response to the positioning of a respective one of said predetermined points at a respective selected supply means to form color codes on each section different from the color codes of the other sections of the tape and in the same relative positions.

16. A method as set forth in claim 15 which further includes the step of severing the tape between said sections to form individual index tabs of the severed portions with each tab having a color code different from the color codes of the other tabs.

* * * * *